United States Patent [19]

Fishback et al.

[11] Patent Number: 5,686,500
[45] Date of Patent: Nov. 11, 1997

[54] POLYOL COMPOSITION HAVING GOOD FLOW AND WATER BLOWN RIGID POLYURETHANE FOAMS MADE THEREBY HAVING GOOD DIMENSIONAL STABILITY

[75] Inventors: Thomas L. Fishback, Gibraltar; Curtis J. Reichel; Thomas B. Lee, both of Southgate, all of Mich.

[73] Assignee: BASF Corporation, Mt. Olive, N.J.

[21] Appl. No.: 428,782

[22] Filed: Apr. 21, 1995

Related U.S. Application Data

[62] Division of Ser. No. 125,070, Sep. 23, 1993, abandoned.

[51] Int. Cl.$^6$ ............... C08J 9/08; C08G 18/18; C08G 18/20; C08G 18/48
[52] U.S. Cl. ............... 521/129; 521/128; 521/130; 521/174; 521/176
[58] Field of Search ............... 521/174, 176, 521/129, 130, 128

[56] References Cited

U.S. PATENT DOCUMENTS

| | | | |
|---|---|---|---|
| 4,331,778 | 5/1982 | Sommerfeld et al. | 521/129 |
| 4,923,904 | 5/1990 | Hasegawa et al. | 521/115 |
| 4,929,646 | 5/1990 | Nichols et al. | 521/137 |
| 5,128,381 | 7/1992 | Tane et al. | 521/117 |
| 5,318,997 | 6/1994 | Okada et al. | 521/174 |
| 5,478,494 | 12/1995 | Lee et al. | 521/174 |

*Primary Examiner*—Rabon Sergent
*Attorney, Agent, or Firm*—Fernando A. Borrego

[57] ABSTRACT

A polyol composition is provided which when reacted with and organic isocyanate, has good flow characteristics and makes an all water blown rigid polyurethane foam having good dimensional stability at low core densities of 1.1 pcf to 2.0 pcf. The polyol composition has a polyol component which must have present a polyoxyalkylene polyether polyol having an equivalent weight of 130 or less, an average functionality of 3.1 or greater, and a hydroxyl number of 400 or more, a polyoxyalkylene polyether polyol having an average functionality from 1.5 to 3.1 and a viscosity of less than 800 cP at 25° C., and a polyoxyalkylene polyether polyol having an average functionality of greater than 3.1 and an equivalent weight of greater than 130. The polyol composition also has water as the blowing agent, and further contains a blow catalyst, a delayed action gel catalyst, and preferably a cure catalyst and a surfactant.

3 Claims, No Drawings

POLYOL COMPOSITION HAVING GOOD FLOW AND WATER BLOWN RIGID POLYURETHANE FOAMS MADE THEREBY HAVING GOOD DIMENSIONAL STABILITY

This is a division, of application Ser. No. 08/125,070 filed Sep. 23, 1993, now abandoned.

FIELD OF THE INVENTION

The invention relates to a polyol composition comprised of: polyols having certain equivalent weights, functionalities, and viscosities; water as the sole blowing agent; a blow catalyst; and a delayed action gel catalyst. The polyol composition, when mixed with the isocyanate compound, exhibits improved flow characteristics and reacts to form a dimensionally stable rigid polyurethane foam at low densities with good adhesion to plastic substrates.

BACKGROUND OF THE INVENTION

In a move to reduce or eliminate ozone-depleting blowing agents from the manufacture of polyurethane foams, much effort has gone into investigating the use of water as a chemically active blowing agent such as water. In situations where one desires a reaction mixture of the isocyanate and polyol composition to flow across a mold surface or throughout a cavity before the onset of a hard gel, using water as a blowing agent has been found problematic. Water does not have the solvency that some CFC's and HCFC's possess leading to a poorer flowing liquid reaction mixture. Further, the isocyanate reaction with water rapidly develops a high exotherm so that isocyanate/polyol polyurethane linkages are quickly formed and the reaction mixture prematurely gels before it can flow throughout the mold. The rapid kinetics of the isocyanate/water reaction also leads to excessive pressure generation, which forms a gas pocket impeding the flow of the reaction mixture. As a result, water-blown rigid polyurethane foams made in a mold or a pour behind application generally exhibit voids and bubbles where the reaction mixture could not flow. This problem is further exacerbated when one desires to make a low density rigid foam because more water must be added to lower the foam density, thereby further increasing the heat of the exotherm. Also, carbon dioxide gas blowing the reaction mixture produced from the isocyanate/water reaction tends to diffuse out of the foam cells, leading to foam shrinkage which becomes more severe as more water is used to make low density foams.

In an attempt to alleviate this problem, crosslinking agents and/or highly functional low molecular weight polyols are added to increase the crosslinking density, thereby improving the foam strength and reducing shrinkage. By adding crosslinking agents and/or highly functionalized low molecular weight polyols to a polyol composition, the flow characteristics of the reaction mixture suffer because the viscosity of the system is increased and more active hydrogen sites are available for reaction with the isocyanate to form a stiffer gel even more quickly. Furthermore, increasing the crosslinking density sufficient to achieve a dimensionally stable foam along with high water concentrations to lower the density results in a friable foam which has low adhesion to a substrate in pour behind applications.

Polyol compositions generally have fast acting catalysts to speed up the isocyanate-polyol reaction. In an all water-blown system, however, the fast acting catalysts also contribute to the poor flow of the reaction mixture by hastening the formation of a gel. Using merely a slower acting polyurethane promoting catalyst in an all water-blown system does not alleviate the formation of voids because the isocyanate-water reaction by itself it hot enough to form a gel front and inhibit the flow of the unreacted reaction mixture behind the gel front.

As a means for solving these problems, a copending application filed describes a formulation containing formic acid and water as blowing agents, specific blow and gel catalysts and a specific polyol combination, wherein the reaction mixture has good flow and the foam made thereby has low friability and good dimensionally stability even at low densities. In view of the limited use of formic acid as a blowing agent for polyurethane foams worldwide and the practical non-existent use of formic acid in the United States, there exits a reluctance in the industry to run a formulation containing formic acid through mixing and injection equipment, which industry is accustomed to using CFC's and HCFC's as the blowing agent. Therefore, a continuing need exists for an all water blown formulation which will solve the above mentioned problems.

SUMMARY OF THE INVENTION

It is an object of the invention to make a liquid polyurethane foaming system which exhibits enhanced flow. It is a further object of the invention to make a rigid polyurethane foam which is dimensionally stable at low densities.

We have found that the flow characteristics of a reaction mixture for the manufacture of rigid polyurethane foams are improved when a specific polyol component is employed to react with an organic aromatic polyisocyanate in the presence of a blowing agent. We have also found that the specific polyol component in combination with water as the sole blowing agent, along with a blowing catalyst, a time delayed gel catalyst, and preferably a cure catalyst further improves the flow characteristics of the reaction mixture while simultaneously yielding a rigid polyurethane with good dimensional stability. This polyol component, along with water as the blowing agent and certain catalysts, advantageously permits one to control the reaction profile such that prior to the onset of a firm gel, the reaction mixture is propelled with the aid of the blowing catalyst, thereby providing enhanced flow characteristics. An unexpected advantage of the polyol composition containing the polyol component, water, and catalyst combination is that the rigid foams produced therefrom possess excellent dimensional stability at low densities.

DETAILED DESCRIPTION OF THE INVENTION

The Polyol Composition

In one inventive feature, a polyol composition has been developed which exhibits good flow characteristics in a reaction with an organic isocyanate and in the presence of blowing agents. The polyol composition comprises a polyol component. The polyol component comprises:

a) a polyoxyalkylene polyether polyol having a low equivalent weight at or below 130, a average functionality of 3.1 or greater, and an OH number of 400 or above to crosslink the polyurethane chains and promote dimensional stability;

b) a polyoxyalkylene polyether polyol having an average functionality in the range from 1.5 to less than 3.1 and a viscosity at or below 800 cP at 25° C. to reduce the viscosity of the composition and reduce the friability of the foam; and, c) a polyoxyalkylene polyether polyol having an average functionality greater than 3.1 and an equivalent weight of greater than 130.

The first criterion (a) requires the use of a polyol having an equivalent weight of 130 or less, preferably 120 or less, most preferably 115 or less, with OH numbers of 400 or higher, preferably 450 or more, most preferably 480 or more, and an average functionality of greater than 3.1, preferably 4 or more, most preferably 4.5 or more. Employing a polyol having an OH and an equivalent weight within these ranges is necessary to impart structural integrity to the foam through crosslinking and to prevent foam collapse. A polyol having an equivalent weight greater than 130 will polymerize with isocyanate to form a chain segment tending to be too flexible, and a polyol having an OH number less than 400 possesses insufficient reactive sites relative to the molecular weight of the polyol to promote a suitable crosslinking density. The structural strength of the foam becomes a major consideration in the manufacture of low density foams which tend to collapse or shrink under aging conditions.

Many polyols satisfying criterion (a) possess high viscosities due to their high hydroxyl numbers and low equivalent weights. A polyol composition with high viscosities will have great difficulty flowing throughout a mold before the polyol-isocyanate reaction mixture gels. Once the urethane gels to form a hard matrix, the reaction mixture behind the gel front proceeds forward only with great difficulty or is substantially prevented from flowing across the gel front to fill the remaining portions of the mold. As the blowing agent gases are released from the reaction mixture trapped behind the hard gel, a localized pressure build-up forms in this area creating large, uneven cell structures or voids in the foam.

The flow characteristics of the reaction mixture in this invention are improved through a physical modification to the viscosity of the polyol component; and further improved through formulating the composition to contain certain blowing agents and catalysts, which is chemical modification to the polyol composition. The physical modification to the viscosity of the polyol component is accomplished by adding a polyoxyalkylene polyether polyol having a viscosity of 800 Cp or less, preferably 550 cP or less, at 25° C. to the polyol component, thereby improving the flow of the polyol component, the polyol composition, and the reaction mixture of the polyol composition and the isocyanate. Such a polyol preferably has a low functionality ranging from 1.8 to less than 3.1, but preferably ranges from 1.9 to 2.1. These low functional polyols of low viscosity also greatly contribute toward reducing the surface friability of the low density foam. The equivalent weight of such a polyol is not limited so long as the viscosity of the polyol is 800 cP or less. In general, the low viscosity polyols used in the invention have equivalent weights ranging from about 80 to 1500, with preferred ranges from greater than 130 to 750.

The polyol satisfying criterion (c) is a bulk polyol suitable in the manufacture of rigid polyurethane foams having an average functionality greater than 3.1 for strength through crosslinking, preferably 3.5 or greater, most preferably 3.9 or greater. This polyol also has an equivalent weight of greater than 130, preferably 140 or more so that while it contributes to the strength of the foam through crosslinking, it is believed, without being bound to a theory, that the longer molecular chains per functional group provide a proper balance between the number of hard and soft segments formed in the polymer matrix and prevent the foam from becoming too tight. While not critical, it is desired that the polyol used has a viscosity of about 10,000 cP or less, preferably about 5000 cP or less, most preferably about 3,000 cP or less, at 25° C. to further assist in reducing the viscosity of the polyol composition.

One of the features of the invention lies in a polyol composition having a low viscosity to promote good flow of the reaction mixture, achieved in large through use of the polyol component described above. We have achieved polyol composition viscosities of 2,000 cPs or less, with 1500 cPs or less being more preferred, and 1000 cPs or less being most preferred, at 25° C.

Optimal amounts of polyols used in the polyol component are determined by a polyol reaction mixture exhibiting good flow through use of a low viscosity polyol(s), along with sufficient crosslinker polyol(s) to render the low density foam stable, and balanced with bulk polyol(s) to prevent the foam from becoming friable through an otherwise excessive amount of the crosslinker polyol while maintaining structural integrity. In one non-limiting embodiment of the invention, the amount of bulk polyol c) ranges from 20 weight percent to 75 weight percent, preferably 20 weight percent to 40 weight percent, the amount of crosslinking polyol a) ranges from 10 weight percent to 50 weight percent, preferably 20 weight percent to 40 weight percent, and the amount of low viscosity polyol ranges from 20 weight percent to 60 weight percent, preferably 25 weight percent to 45 weight percent, based on the weight of all polyols used in the polyol component. Furthermore, it is also preferred that the total amount by weight of low viscosity polyol(s) (b) is greater than or equal to the total amount by weight of crosslinking polyol(s) (a) as it is believed that optimal flow characteristics and foam stability can be attained by this ratio.

Suitable polyols used in the polyol component are polyoxyalkylene polyether polyols, which is meant herein to include conventional polyoxyalkylene polyether polyols, as well as the polymer modified polyoxyalkylene polyether polyols. Polyester polyols and polyether polyester polyols may advantageously be admixed with the polyether polyols to promote improved adhesion of the foam to substrates, so long as the criteria a)-c) with respect to the polyoxyalkylene polyether polyols are satisfied. Since one of the advantages of the polyol composition of the invention lies in its low viscosity, it is preferred that the amount of polyester based polyols admixed not raise the viscosity of the polyol composition beyond about 2,000 cPs at 25° C.

Suitable polyester polyols include those obtained, for example, from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylie acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, therphthalic acid, phthalic acid, hemimellitic acid, and 1,4-cyclohexanedicarboxylic acid, A suitable polyhydric alcohol may be used such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Those which satisfy criteria (a)-(c) are polyoxyalkylene polyether polyols which are the polymerization products of alkylene oxides with polyhydric alcohols. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

The alkylene oxides may be added to the initiator, individually, sequentially one after the other to form blocks, or in mixture to form a heteric polyether. The polyalkylene polyether polyols may have either primary or secondary hydroxy groups. It is preferred that at least one of the polyols, more preferably all of the polyols which satisfy criteria a)–c) are polyether polyols terminated with a secondary hydroxyl group through addition of, for example, propylene oxide, and most preferably containing solely polyoxypropylene groups. Suitable polyols also include, however, those terminated with ethylene oxide in the amount from 1 to 30 weight percent. Included among the polyether polyols are polyoxyethylene glycol, polyoxypropylene glycol, polyoxybutylene glycol, polytetramethylene glycol, block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Suitable initiator molecules include those disclosed above for the preparation of the polyester polyols. Other initiators include aromatic amines such as aniline, N-alkylphenylenediamines, 2,4'-, 2,2'-, and 4,4'-methylenedianiline, 2,6- or 2,4-toluenediamine, vicinal toluenediamines, o-chloroaniline, p-aminoaniline, 1,5-diaminonaphthalene, methylene dianiline, the various condensation products of aniline and formaldehyde, and the isomeric diaminotoluenes; and aliphatic amines such as mono-, di, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine.

Preferable polyhydric alcohols include trimethylolpropane, glycerine, sucrose, sorbitol, propylene glycol, dipropylene glycol, pentaerythritol, and 2,2-bis(4-hydroxyphenyl)-propane and blends thereof. The polyols satisfying component b) are preferably initiated with dihydric alcohols, and further oxyalkylated solely with propylene oxide.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether polyol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction produce of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butane-1,4-dithiol; and alkene thiols such as 3-hexene-1,6-dithiol.

Also suitable as the polyols (a)–(c) are polymer modified polyols, in particular, the so-called graft polyols. Graft polyols are well known to the art and are prepared by the in situ polymerization of one or more vinyl monomers, preferably acrylonitrile and styrene, in the presence of a polyether polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 5,524,157; all of which patents are herein incorporated by reference.

Non-graft polymer modified polyols are also suitable, for example, as those prepared by the reaction of a polyisocyanate with an alkanolamine in the presence of a polyether polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

The polyol composition further comprises water as the sole blowing agent. By the phrase "sole blowing agent" is meant to exclude any agent other than water added to control the density of the foam by providing gases for expansion of the reaction mixture. However, those time delayed gel catalysts described further below blocked with an organic carboxylic acid, which acid may have the incidental effect of reacting with the isocyanate group to liberate gases, are included in the polyol composition but are not deemed blowing agents within the scope of the invention as the compounds' function are catalytic by nature. Thus, excluded from the polyol composition are physically active blowing agents and chemically active blowing agents other than water, although organic acid blocked catalysts are included.

The amount of blowing agent used is dependent upon the desired density of the rigid polyurethane foam. The foam densities may range from 1.0 p.c.f. to 4.0 p.c.f. taken from the core of either a free rise rigid polyurethane foam or a packed (molded) rigid polyurethane foam. However, a noteworthy advantage of the polyol composition containing water as the sole blowing agent is the ability to make low density rigid polyurethane foams which are dimensionally stable, whether open celled or closed celled. Therefore, the preferred core foam densities range from 1.1 p.c.f. to 2.0 p.c.f., more preferably from 1.2 to 1.9 pcf, most preferably from 1.3 to 1.7 pcf. The preferred overall densities of foams packed to 10% by weight, meaning the percentage by weight of foam ingredients above the theoretical amount needed to fill the volume of the mold upon foaming, are from about 1.4 to about 2.2 pcf, more preferably from 1.5 to 2.0 pcf, with the difference between the core densities of these 10% by weight packed foams advantageously and their overall densities being 15% or less, more preferably about 8% or less, most preferably about 6% or less, based on the overall density of the 10% packed foam. The closer the value between the overall density and the core density of a foam packed in a mold, the more uniform is the flow of the reaction mixture throughout the mold. To achieve these density levels, suitable amounts of water added in the polyol composition range from 3.0 to 15.0 parts by weight (p.b.w.), more preferably 4.0 p.b.w. to 10.0 p.b.w., most preferably from 6 p.b.w. to 8 p.b.w., based on 100 p.b.w. of the polyol component.

The types of catalyst and their combination were designed for the preparation of polyurethane foams using the polyols meeting criteria (a)–(c) and water as the sole blowing agent. The exotherm developing between a water-isocyanate reaction is very high. With the rapid increase in temperature, the polyurethane matrix develops and solidify quickly, and consequently, the reaction mixture has difficulty flowing throughout the mold cavity. Therefore, the catalysts used in the invention advantageously employ a blowing catalyst to forcefully propel the quickly forming polymer matrix forward so that the mold cavity is filled without developing voids, in combination with a delayed action gel catalyst to accelerate the formation of urethane linkages at the latter stages of the reaction once the reaction mixture has flowed throughout the mold cavity. In reality, the catalysts will not act neatly in such a stepwise timed manner, but rather there will be a continuum of activity with the substantial blowing activity occurring in the initial phase of the reaction profile and the gelling catalytic occurring in the latter stages of the reaction profile. Merely using a combination of a blow and gel catalyst without a time delay feature on the gel catalyst would cause the formulation to gel so quickly that even with the help of the blow catalyst, the reaction mixture would not have a suitable flow. Conversely, employing a delayed action blow catalyst and a delayed action gel catalyst would also impede the flow of the reaction mixture since the water-isocyanate is so exothermic that the polymer matrix quickly stiffens. Thus, a fast acting blow catalyst is needed.

The blowing catalysts used in the invention are tertiary amines, preferably tertiary amine ethers. The blow catalysts have the general formula:

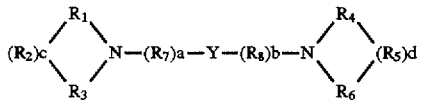

wherein $R_1$, $R_3$, $R_4$, and $R_6$ are each independently branched or preferably unbranched $C_1-C_5$ alkyl radicals when the corresponding c or d equals zero, preferably methyl or ethyl radicals, and $R_1$, $R_3$, $R_4$, and $R_6$ are each independently a methylene group when the corresponding c or d is greater than zero;

$R_2$ and $R_5$ are branched or preferably unbranched methylene groups, optimally containing an ether $R_7$ and $R_8$ are each independently branched or unbranched methylene groups:

Y is oxygen, or

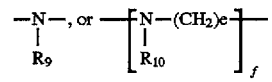

preferably oxygen, $R_9$ and $R_{10}$ are each independently a $C_1-C_5$ radical; preferably a methyl or an ethyl radical;

a and b are each independently an integer from 1 to 6, preferably 1 to 2;

c and d are each independently an integer from 0 to 6, preferably 0;

e is an integer from 2 to 4; and f is an integer from 1 to 3.

Specific examples of tertiary amine blowing catalysts include one or more of N,N,N,N'-tetramethyl-2,2'-diaminodiethyl ether; N,N,N,'N",N"pentamethyl diethyl triamine; N,N,N',N",N"',N"",N"" hydromethyl tetraethyl pentamine; N,N,N',N",N" pentamethyl dipropylene traimine, 2 dimethylaminoethyl-1,3-dimethylaminopropyl ether; and N,N-dimorpholinoethyl ether.

The second catalyst provided in the polyol composition is a delayed action gel catalyst designed to increase the reaction rate between the polyols and isocyanate in a time delayed fashion while promoting dimensional stability. The delayed action gel catalyst may, depending upon the structure, be blocked with an organic carboxylic acid or unblocked. Suitable delayed action gel catalysts are any tertiary amine catalysts known in the polyurethane art to have time delay properties, including alicyclic tertiary amines and aliphatic tertiary amines. Preferred delayed action gel catalysts are those that are unblocked in view of their economic advantage and to eliminate the possibility of side reactions occurring through reaction between the disassociated carboxylate ion and amine initiated polyethers or isocyanate groups. Unblocked tertiary amines with the following general formula are well adapted for use in the invention as a delayed action gel catalyst:

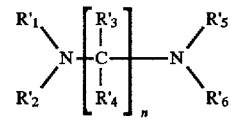

wherein $R_1'$, $R_2'$, $R_5+$, and $R_6'$ are each independently a $C_1-C_5$ branched or unbranched alkyl radical, preferably methyl or ethyl radical, optionally substituted with a hydroxyl group. $R_3'$ and $R_4'$ are each independently hydrogen or $C_1-C_3$ alkyl radicals, preferably hydrogen; and n is an integer from 4 to 10, preferably 6 to 8.

Examples of aliphatic gel catalyst are N,N,N',N' tetramethyl hexamethylene diarnine and N,N' dimethyl - N,N'-diisopropyl hexamethylenediamine, the former being preferred.

Other tertiary amine gel catalysts which are useful in the invention are the organic acid blocked aliphatic, alicyclic or heterocyclic tertiary amine catalysts known in the art to catalyze the isocyanate-polyol reaction. Some of these tertiary amines having the general formulas:

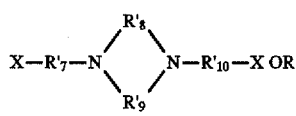

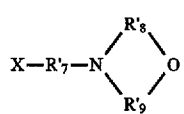

wherein $R_7'$ and $R_{10}'$ are each independently a branched or unbranched $C_1$ to $C_{10}$ methylene groups, preferably $C_1$–$C_3$ methylene groups, or wherein $R_7'$ and $R_{10}'$ may be connected to each other to form a closed ring having 2 to 6 carbon atoms between the nitrogens; and $R_8'$ and $R_9'$ are each independently a branched or unbranched $C_1$ to $C_6$ methylene groups; the bonds across the N or O atoms and the $R_8'$ or $R_9'$ groups are single or double, preferably single; X is hydrogen or

wherein R" and R"' are each independently a branched or unbranched $C_1$ to $C_6$ alkyl radical, preferably a methyl or ethyl radical, and wherein R' and R" may be optionally connected to each other through an oxygen or a substituted tertiary nitrogen to form a closed ring having 2 to 6 carbon atoms.

Suitable organic carboxylic acid blocked amine gel catalysts are the acid blocked amines of triethylenedamine, N-ethyl or methyl morpholine, N,N dimethylaminoethyl morpholine, N-butylmorpholine, N,N' dimethylpiperazine, bis- (dimethylamino-alkyl)-piperazines, and 1,2 dimethyl imidazole.

Still other tertiary amine catalysts are the organic acid blocked tertiary amines. Suitable organic carboxylic acids used to block the tertiary amine gel catalysts, if needed to provide a time delayed action, include mono- or dicarboxylic acids having 1–20 carbon atoms, such as formic, acetic, pripionic, butyric, caproic, 2-ethyl-hexanoic, caprylic, cyanoacetic, pyruvic, benzoic, oxalic, malonic, succinic, and maleic acids, with formic acid being preferred. The organic acid blocked tertiary amine gel catalysts are usually dissolved in water or organic solvents to avoid separation of the salt as crystals and the resultant phase separation. Preferably organic solvents include polyols having 2 to 4 hydroxyl groups in the molecule, such as ethylene glycol, diethylene glycol, propylene glycol, dipropylene glycol, butanediols, 2,6-hexanediol and glycerine. Among the cited compounds most frequently used are ethylene glycol, diethylene glycol, propylene glycol, dipropylene glycol and 1,4-butanediol.

The delayed action gel catalysts are fully blocked or partially blocked with an organic carboxylic acid to yield a respective, blocked fully tertiary amine salt of the organic carboxylic acid or a partial salt of the organic carboxylic acid. The amount of organic carboxylic acid reacted with the tertiary amine gel catalyst depends upon the degree to which one desires to delay the tertiary amine catalytic activity. A fully blocked tertiary amine gel catalyst will have at least a 1:1 molar ratio of carboxylic acid equivalents to amine group equivalents. It is preferred that the tertiary amine gel catalyst is fully blocked within the polyol composition. In those cases where the delayed action feature is attributable to carboxylic acid blocking, is also preferred that the tertiary amine gel catalyst possess is blocked prior to addition into the polyol composition. Although it is within the scope of the invention that a fast acting gel catalyst may be added to the polyol composition along with a desired stoichiometric mount of formic acid separately added, this embodiment is not preferred because kinetically the formic acid may not find and bond to each gel catalyst molecule and/or may bond to amine initiated polyether polyols present in the polyol composition.

The total amount of blowing catalyst and delayed action gel catalyst in the polyol composition is that amount by weight effective to accelerate the reaction between the blowing agent(s)-polyols and the isocyanate to yield a dimensionally stable foam. Generally, the total amount of blowing and delayed action gel catalysts combined are greater than 0.4 to 4.0 pbw, based on 100 pbw of the polyol component. At the extreme lower end of the range, dimensional stability and flow might in some cases begin to suffer, while amounts as high as around 4.0 are usually not necessary to provide the necessary catalytic activity. Thus, preferred amounts of the blow and delayed action gel catalysts combined are from 0.7 to 3.0. Generally, the more blowing catalyst that the polyol composition contains, the further the reaction mixture flows. One may adjust the ratio of blowing catalyst to delayed action gel catalyst to optimize flow and dimensional stability in a cost effective manner. Molar ratios of blowing catalyst to delayed action gel catalyst from 0.5–2:1 are quite adequate for these purposes.

A cure catalyst is generally employed to shorten tack time and promote green strength, and the use of such a catalyst is preferred and advisable to assist in the prevention of foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn$ $[X—R^1—Y]_2$, wherein R is a $C_1$–$C_8$ alkyl or aryl group, $R^1$ is a $C_0$–$C_{18}$ methylene group optionally substituted or branched with a $C_1$–$C_4$ alkyl group, Y is hydrogen or an hydroxyl group, preferably hydrogen, X is methylene, an —S—, an —SR$^2$COO—, —SOOC—, and —O$_3$S—, or an —OOC— group wherein $R^2$ is a $C_1$–$C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8 C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8 C) tin (IV) salts of inorganic compounds such as butyltin trichloride, dimethyl- and diethyl- and dibutyl- and dioctyl- and diphenyl- tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20 C) tin dimercaptides, including dimethyl-, dibutyl-, and dioctyltin dimercaptides. Suitable amounts of cure catalyst range from 0.01 to 3.0 pbw, preferably from about 0.01 to 1.5 pbw based on 100 pbw of the polyol component, with about 1.0 pbw being all that is needed to provide a dimensionally stable foam.

Urethane-containing foams may be prepared with or without the use of chain extenders and/or crosslinking agents (c), which are neither necessary nor preferred in this invention to achieve the desired mechanical properties and dimensional stability. If chain extenders are used, the following description provides guidance. Chain extenders and/or crosslinking agents are diols and/or triols having a molecular weight of less than 400, preferably from 60 to 300. Examples are dialkylene glycols and aliphatic, cycloaliphatic and/or araliphatic diols having from 2 to 14 carbon atoms, preferably from 4 to 10 carbon atoms, e.g., ethylene glycol, 1,3-propanediol, 1,10-decanediol, o-, m-, and p-dihydroxycyclohexane, diethylene glycol, dipropylene glycol, and preferably 1,4-butanediol, 1,6-hexanediol, bis(2-hydroxyethyl)hydroquinone, triols such as 1,2,4- and 1,3,5-trihydroxycyclohexane, glycerol, and trimethylolpropane.

Polyurethane foams can also be prepared by using secondary aromatic diamines, primary aromatic diamines, 3,3'-di- and/or 3,3'-, 5,5'-tetraalkyl-substituted diaminodiphenylmethanes as chain extenders or crosslinking agents instead of or mixed with the above-mentioned diols and/or triols. By the term polyurethane foam as used herein is also meant to include polyurethane-polyurea or polyisocyanurate foams.

Examples of secondary aromatic diamines are N,N'-dialkyl-substituted aromatic diamines, which are unsubstituted or substituted on the aromatic radical by alkyl radicals, having 1 to 20, preferably 1 to 4, carbon atoms in the N-alkyl radical, e.g., N,N'-diethyl-, N,N'-di-sec-pentyl-, N,N'-di-sec-hexyl-, N,N'-di-sec-decyl-, and N,N'-dicyclohexyl-p- and m-phenylenedamine, N,N'-dimethyl-, N,N'-diethyl-, N,N'-diisopropyl-, N,N'-disec-butyl- and N,N'-dicyclohexyl-4,4'-diaminodiphenylmethane and N,N'-di-sec-butylbenzidine.

If aromatic diamines are used, it is best to use those which have at least one alkyl substituent in the orthoposition to the amino groups, are liquid at room temperature, and are miscible with the polyether polyols. Furthermore, alkyl-substituted metaphenylenediamines of the formulae:

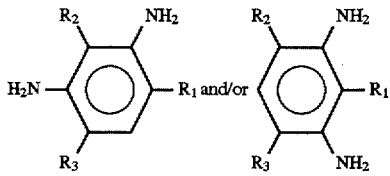

where $R_3$ and $R_2$ are identical or different and are methyl, ethyl, propyl, or isopropyl, and $R_1$ is linear or branched alkyl having 1 to 10 carbon atoms, preferably 4 to 6 carbon atoms, are useful.

Also useful are those alkyl radicals $R_1$ in which the branching point is on the $C_1$ carbon atom. Specific examples of radicals $R_1$ are methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl, and preferably cyclohexyl, 1-methyl-n-propyl, tert-butyl, 1-ethyl-n-propyl, 1-methyl-n-butyl and 1,1-dimethyl-n-propyl.

Specific examples of radicals $R_1$ are methyl, ethyl, isopropyl, 1-methyloctyl, 2-ethyloctyl, 1-methylhexyl, 1,1-dimethylpentyl, 1,3,3-trimethylhexyl,1, 1-ethylpentyl, 2-ethylpentyl and preferably cyclohexyl, 1-methyl-n-propyl, tert-butyl, 1-ethyl-n-propyl, 1-methyl-n-butyl, and 1,1-dimethyl-n-propyl.

Examples of suitable alkyl-substituted m-phenylenediamines are 2,4-dimethyl-6-cyclohexyl-, 2-cyclohexyl-4,6-diethyl-, 2-cyclohexyl-2,36-isopropyl-, 2,4-dimethyl-6-(1-ethyl-n-propyl)-, 2,4-dimethyl-6-(1,1-dimethyl-n-propyl)- and 2-(1-methyl-n-butyl)-4,6-dimethyl-1,3-phenylenediamine. Preference is given to 1-methyl-3,5-diethyl-2,4- and -2,6-phenylenediamines, 2,4-dimethyl-6-tert-butyl-, 2,4-dimethyl-6-isooctyl- and 2,4-dimethyl-6-cyclohexyl-1,3-phenylenediamine.

Examples of suitable 3,3'-di- and 3,3', 5,5'-tetra-n-alkyl-substituted 4,4'-diaminodiphenylmethanes are 3,3'-di-, 3,3', 5,5-tetramethyl, 3,3-di-, 3,3',5,5-tetraethyl-, 3,3-di- and 3,3', 5,5'-tetra-n-propyl-4,4'-diaminodiphenylmethane.

Preference is given to diaminodiphenylmethanes of the formula:

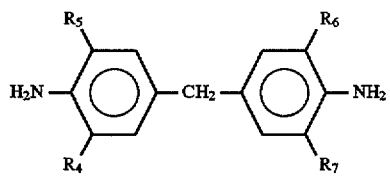

where $R_4$, $R_5$, $R_6$, and $R_7$ are identical or different and are methyl, ethyl, propyl, isopropyl, sec-butyl or tert-butyl, but where at least one of the radicals must be isopropyl or secu-butyl. The 4,4'-diaminodiphenylmethanes may also be used in a mixture with isomers of the formulae:

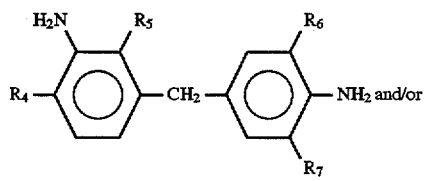

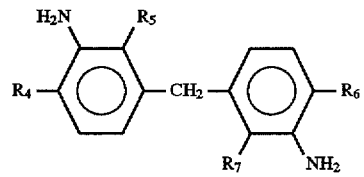

where $R_4$, $R_5$, $R_6$, and $R_7$ are as defined above.

Preference is given to 3,4-dimethyl-3',5'-diisopropyl- and 3,3',5,5'-tetraisopropyl-4,4'-diaminodiphenylmethane. The diaminodiphenylmethanes can be employed individually or in the form of mixtures.

Said chain extenders/crosslinking agents can be used individually or as mixtures of identical or different types of compounds.

The amount of chain extender, crosslinking agent or mixture thereof used, if any, is expediently from 2 to 20 percent by weight, preferably from 1 to 15 percent by weight, based on the weight of the polyols. However, it is preferred that no chain extender/crosslinker is used for the preparation of rigid foams since the polyether polyols described above are sufficient to provide the desired mechanical properties.

If desired, assistants and/or additives (f) can be incorporated into the reaction mixture for the production of the cellular plastics by the polyisocyanate polyaddition process. Specific examples are surfactants, foam stabilizers, cell regulators, fillers, dyes, pigments, flame-proofing agents, hydrolysis-protection agents, and fungistatic and bacteriostatic substances.

Examples of suitable surfactants are compounds which serve to support homogenization of the starting materials and may also regulate the cell structure of the plastics. Specific examples are salts of sulfonic acids, e.g., alkali metal salts or ammonium salts of dodecylbenzene- or dinaphthylmethanedisulfonic acid and rininoleic acid; foam stabilizers, such as siloxane-oxyalkylene copolymers and other organopolysiloxanes and especially those made by addition of ethylene oxide and/or propylene oxide to a dimethylpolysiloxane, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. Suitable amounts of surfactant are those amounts effective to yield a dimensionally stable foam having good flow. The specific amount of surfactant will vary depending upon the particular kinds and amounts of polyols, catalysts, and water employed, as well as the kind of surfactant employed, but are usually used in amounts of 0.01 to 5 parts by weight, based on 100 parts by weight of the polyol component, and preferably are used in amounts ranging from 0.25 to 2.0. It has been found, however, that best dimensional stability is obtained when the amount of surfactant ranges from 0.5 to 1.0 parts by weight.

For the purposes of the invention, fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyols and the isocyanate); but the content of mats, nonwovens and wovens made from natural and synthetic fibers may reach values of up to 80 percent by weight.

Examples of suitable flameproofing agents are tricresyl phosphate, tris(2-chloroethyl) phosphate, tris(2-chloropropyl) phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more timeproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 parts by weight, preferably from 5 to 25 parts by weight, of said flameproofing agents may be used per 100 parts by weight of the polyols.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983.

Suitable organic polyisocyanates (a), defined as having 2 or more isocyanate functionalities, are conventional aliphatic, cycloaliphatic, araliphatic and preferably aromatic isocyanates. Specific examples include: alkylene diisocyanates with 4 to 12 carbons in the alkylene radical such as 1, 12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diiocyanate), 2,4-hexahydrotoluene diisocyanate as well as the corresponding isomeric mixtures, 4,4'- 2,2'- and 2,4'-dicyclohexylmethane diisocyanate as well as the corresponding isomeric mixtures and preferably aromatic diisocyanates and polyisocyanates such as 2,4- and 2,6-toluene disocyanate and the corresponding isomeric mixtures 4,4'- 2,4'-, and 2,2'-diphenylmethane diisocyanate and the corresponding isomeric mixtures, mixtures of 4,4'- 2,4'- and 2,2-diphenylmethane diisocyanates and polyphenylene polymethylene polyisocyanates (crude MDI), as well as mixtures of crude MDI and toluene diisocyanates. The organic di- and polyisocyanates can be used individually or in the form of mixtures. Particularly preferred for the production of rigid foams is crude MDI containing about 50 to 70 weight percent polyphenyl-polymethylene polyisocyanate and from 30 to 50 weight percent diphenylmethane diisocyanate.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanaurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 6000; modified 4,4'-diphenylemthane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 29 to 3.5 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2 4' and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'-and/or 2,6-toluene diisocyanate.

To produce the cellular urethane-containing plastics, the organic polyisocyanate and the polyol composition is reacted in such amounts that the ratio between the number of equivalents of NCO groups in the polyisocyanate and the total number of reactive hydrogen atoms in the polyol composition is from 1:0.85 to 1.25, preferably from 1:0.95 to 1.15. If the rigid foams, at least in part, contain bonded isocyanurate groups, a ratio of from 1.4 to 60: 1, preferably from 1.5 to 8:1, is usually used.

The rigid foams made from polyisocyanate polyaddition products are advantageously produced by the one-shot process, for example, using reaction injection moldings or the high pressure or low pressure pour method in an open or close mold such as a metallic mold, or in a pour-in-place application where the surfaces contacting the reaction mixture form a part of the finished article.

The starting components may be mixed at from 15° to 90° C., preferably at from 200 to 35° C., and introduced into the open or closed mold, if desired under super-atmospheric pressure. The mixing, as stated above, can be carried out mechanically by means of a stirrer or a stirring screw or under high pressure by the impingement injection method. The mold temperature is expediently from 20° to 110° C., preferably from 30° to 60° C., in particular from 45° to 50° C.

The rigid foams produced by the process according to the invention and the corresponding structural foams are used, for example, in the vehicle industry—the automotive, aircraft, and shipbuilding industries—and in the furniture, door, insulation, and sports goods industries. They are particularly suitable in the construction and refrigeration sectors, for example, as intermediate layers for sandwich elements or for foam-filling refrigerators, freezer housings, and picnic coolers.

For pour-in-place applications, the rigid foam may be poured or injected to form a sandwich structure of a first substrate/foam/second substrate or may be laminated over a substrate to form a substrate foam structure. The first and second substrate may each be independently made of the same material or of different materials, depending upon the end use. Suitable substrate materials comprise metal such as aluminum, tin, or sheet metal; wood, including composite wood; acrylonitrile-butadiene-styrene (ABS) triblock of rubber, optionally modified with styrene-butadiene diblock, styrene-ethylene/butylene-styrene triblock optionally with maleic anhydride and/or maleic acid, polyethylene terephthalate, polycarbonate, polyacetals, rubber modified high impact polystyrene (HIPS), blends of HIPS with polyphenylene oxide, copolymers of ethylene and vinyl acetate, ethylene and acrylic acid, ethylene and vinyl alcohol, homopolymers or copolymers of ethylene and propylene such as polypropylene, high density polyethylene, high molecular weight high density polyethylene, polyvinyl chloride, nylon 66, or amorphous thermoplastic polyesters. Preferred are ABS, HIPS, polyethylene, and high density polyethylene.

The polyurethane foam may be contiguous to and bonded to the inner surfaces of the first and second substrates, or the polyurethane foam may be contiguous to a layer or lamina of synthetic material interposed between the substrates. Thus, the sequence of layers in the composite may also comprise a first substrate/polyurethane foam/layer or lamina/second substrate or first substrate/layer or lamina/ polyurethane foam/layer or lamina/second substrate.

The layer or lamina of layers additionally interposed into the composite may comprise any one of the abovementioned synthetic resins which have good elongation such as low density polyethylene or low density linear polyethylene as a stress relief layer or a material which promotes adhesion between the polyurethane foam and the first and/or second substrate of choice.

When a synthetic plastic material such as polyethylene having few or no bonding or adhesion sites is chosen as the first and/or second substrate as an alternative to an adhesion-promoting layer, it is useful to first modify the substrate surface with a corona discharge or with a flame treatment to improve adhesion to the polyurethane foam.

During the foam-in-place operation, the substrates are fixed apart in a spaced relationship to define a cavity between the first substrate and second substrate, and optionally the inner surface of at least one substrate, preferably both, treated to promote adhesion. This cavity is then filled with a liquid polyurethane system which reacts and foams in situ, bonding to the inner surfaces of the first and second substrates. In the case of a cooler container, such as a picnic cooler, a thermoformed inner liner material is inserted into the outer shell of the cooler, optionally also thermoformed, in a nested spaced relationship to define a cavity, which cavity is then filled with a foamed-in-place polyurethane foam. In many cases, it is only the polyurethane foam which holds together the outer shell and inner liner, underscoring the need for foam dimensional stability. The polyurethane cellular products of the invention are rigid, meaning that the ratio of tensile strength to compressive strength is high, on the order of 0.5:1 or greater and has less than 10 percent elongation. The rigid polyurethane cellular products of the invention are dimensionally stable, exhibiting little or no shrinkage, even at core densities of 1.6 or less. In a preferred embodiment, the rigid polyurethane cellular products of the invention tested according to ASTM D 2126-87 using core samples of density 1.9 pcf or less with dimensions of 3"×3"×1" and taken from a 10% packed boxes measuring 4"×10"×10" advantageously have the following dimensional changes at twenty eight (28) days of exposure: at 158° F./100 percent RH no more than ±10 percent, more preferably no more than ±5 percent, most preferably less than ±3 percent; at 200° F./0.0 percent RH no more than ±7 percent, more preferably no more than ±3 percent, most preferably less than ±2 percent; and at 7 days at 20° F./0.0 percent RH no more than ±5 percent, more preferably no more than ±3 percent, most preferably no more than ±2 percent.

The rigid polyurethane foams are also advantageously not friable at their surface in spite of their low density and the presence of polyols having a high hydroxyl number and low equivalent weight. The foams exhibit a surface friability of less than 6 percent when tested according to ASTM C 421, at core densities of 2.0 pcf or less, even at densities of 1.7 pcf or less. The low surface friability enables the foam to adhere well to substrates.

The following non-limiting experiments were performed to illustrate some of the embodiments of the invention. All amounts are in parts by weight unless otherwise stated.

Polyol A is a vicinal toluenediamine initiated polyoxyethylene polyoxypropylene polyether polyol having a functionality of greater than 3.5, an equivalent weight of greater than 130 commercially available from BASF Corporation as Pluracol® Polyol 824.

Polyol B is a propylene glycol initiated polyoxypropylene polyether polyol having a functionality of about 2, and a viscosity of about 73 at 25° C.

Polyol C is a propylene glycol initiated polyoxypropylene polyether polyol having a functionality of about 2 and a viscosity of about 150 cP at 25° C.

Polyol D is a sorbitol initiated polyoxypropylene polyether polyol having an OH number of 490, a functionality of about 5.4, an equivalent weight of about 115, and a viscosity of about 4,500 cP at 25° C., commercially available from Rhone Poulenc as ALKAPOL SOR-490.

Polyol E is a monoethanolamine initiated propylene oxide ethylene oxide adduct and having a viscosity of about 500 cP at 25 C., an equivalent weight of less than 130, and a nominal OH of about 500 commercially available from BASF Corporation as Pluracol® Polyol 1016.

Iso A is a solvent-free polymethyleric polyphenylene polyisocyanate with a functionality of about 2.7, commercially available from BASF Corporation as LUPRANATE® M2OS Iso.

Catalyst A is DABCO BL-19, commercially available from Air Products and Chemical Co., and is N,N,N', N'-tetramethyl-2,2'-diaminodiethyl ether acting as a blowing catalyst.

Catalyst B is N,N,N',N'-tetramethyl-n-hexyl diamine acting as a delayed action gel catalyst, commercially available from BASF Corporation or Allied Signal.

Catalyst C is dibutyltin dimercaptide, commercially available from Witco Corp. as Fomrez UL-1.

Catalyst D is pentamethyl-diethylene triamine marketed as Polycat 5 available from Air Products and Chemical Co.

Surfactant A is L-6900, a silicone surfactant commercially available from Union Carbide.

EXAMPLE 1

Polyols A, B, C, and D, Surfactant A, Catalysts A, B, and C were all thoroughly mixed together, along with formic acid and water, in the proportions stated below in Table 1 to form a polyol composition. The Iso A and the polyol composition were loaded into tanks kept at room temperature and attached to a high pressure impingement mixing machine pressurized to about 2,000 p.s.i. on the resin and iso sides with shot times as stated below in Table 1. The polyurethane mixture for each sample was poured into a #10 Lily cup, a 4"×19"×19" cake box, and a "×10"×10" cake box overpacked by a theroetical amount of ten (10) percent, to determine the free rise densities of the former two and the overall and core densities of the packed box. Other physical properties, including dimensional stability, of each packed box sampled in Table I were tested according to the following ASTM standards and reported in Table II.

| Test | ASTM |
| --- | --- |
| Compressive Strength | D 1621 |
| Thermal Conductivity | C 518 |
| Friability | C 421 |
| Porosity | D 2856 |
| Dimensional Stability | D 2126 |

TABLE 1

| SAMPLES | 1 | 2 | 3 | 4 | 5 |
| --- | --- | --- | --- | --- | --- |
| POLYOL A | 30 | 30 | 30 | 30 | 40 |
| POLYOL B | 20 | 20 | 20 | 20 | 15 |
| POLYOL C | 20 | 20 | 20 | 20 | 15 |
| POLYOL D | 30 | 30 | 30 | 30 | 30 |
| CATALYST A | 0.2 | 0.4 | 0.6 | 1.0 | 0.6 |
| CATALYST B | 0.2 | 0.4 | 0.6 | 0.6 | 0.5 |
| CATALYST C | 0.1 | 0.1 | 0.1 | 0.1 | 0.1 |
| SURFACTANT A | 1.5 | 1.5 | 1.5 | 1.5 | 0.75 |
| WATER | 7.0 | 7.0 | 7.0 | 7.0 | 7.0 |
| TOTAL | 109.0 | 109.4 | 109.8 | 110.2 | 109.0 |
| INDEX | 109 | 109 | 109 | 109 | |
| ISO A | 200.54 | 200.54 | 200.54 | 200.54 | 205.38 |

TABLE 1-continued

| SAMPLES | 1 | 2 | 3 | 4 | 5 |
| --- | --- | --- | --- | --- | --- |
| REACTIVITY IN #10 LILY CUP | | | | | |
| SHOT TIME (s) | 3.0 | 3.0 | 3.0 | 3.0 | 3.0 |
| CREAM | 11.0 | 8.0 | 6.5 | 4.3 | 4.2 |
| GEL | 47 | 32 | 25 | 19 | 22 |
| RISE | 87 | 69 | 57 | 37 | 48 |
| TACK FREE | 64 | 43 | 36 | 28 | 32 |
| P.C.F. | 1.46 | 1.42 | 1.41 | 1.41 | 1.45 |
| BOX, FREE RISE SHOT | | | | | |
| SHOT TIME (s) | 3.0 | 3.0 | 3.0 | 3.0 | 3.0 |
| HT. | 10" | 10" | 10" | 10" | 10" |
| WT. | 174.9 | 171.2 | 165.6 | 161.6 | 164.3 |
| P.C.F. | 1.66 | 1.63 | 1.58 | 1.54 | 1.56 |
| 10% PACKED PANELS | | | | | |
| SHOT (s) | 2.98 | 2.92 | 2.80 | 2.74 | 2.83 |
| WT (g) | 191.8 | 188.4 | 182.3 | 178.0 | 179.8 |
| ACTUAL PCF (overall) | 1.83 | 1.79 | 1.73 | 1.69 | 1.71 |
| THEOR. PCF (overall) | 1.83 | 1.79 | 1.73 | 1.69 | 1.72 |

TABLE 2

| SAMPLES | 1 | 2 | 3 | 4 | 5 |
| --- | --- | --- | --- | --- | --- |
| DENSITY ACTUAL | | | | | |
| OVERALL | 1.83 | 1.79 | 1.73 | 1.69 | 1.71 |
| CORE | 1.72 | 1.69 | 1.55 | 1.50 | 1.52 |
| COMPRESSIVE STRENGTH | | | | | |
| YIELD PT.-PARR. | 26.7 | 27.2 | 26.9 | 24.0 | 24.6 |
| % DEFL. @ YIELD | 6.2 | 11.3 | 9.2 | 10.3 | 8.9 |
| 10% DEFLECTION | 26.0 | 27.1 | 26.9 | 24.0 | 24.6 |
| MODULUS | 726 | 658 | 636 | 516 | 621 |
| 10% DEFLECTION | 5.9 | 9.2 | 8.7 | 6.4 | 7.8 |
| MODULUS | 85 | 183 | 159 | 120 | 154 |
| K-FACTOR | | | | | |
| INITIAL | 0.162 | 0.195 | 0.205 | 0.220 | 0.219 |
| TEN (10) DAYS | 0.265 | 0.212 | 0.216 | 0.207 | 0.225 |
| FRIABILITY | 4.2 | 3.0 | 1.3 | 5.3 | 3.12 |
| POROSITY | 89.3 | 98.2 | 96.9 | 39.3 | 41.9 |
| DIMENS. STABILITY SSC 150F/100% RH | | | | | |
| ONE (1) DAY | −44.9 | −2.0 | −1.4 | 0.2 | 1.1 |
| TWO (2) DAYS | −47.7 | −0.8 | −3.6 | −0.9 | 0.8 |
| SEVEN (7) DAYS | −43.1 | 0.5 | −2.6 | −0.2 | 2.0 |
| FOURTEEN (14) DAYS | −39.3 | 0.9 | −1.2 | 0.0 | 1.7 |
| TWENTY-EIGHT (28) DAYS | −39.6 | −0.2 | −2.2 | 0.1 | 2.1 |
| 200F/0% RH | | | | | |
| ONE (1) DAY | −36.9 | −0.5 | −1.2 | −0.5 | −2.5 |
| TWO (2) DAYS | −38.6 | −1.1 | −0.8 | −1.0 | −1.8 |
| SEVEN (7) DAYS | −35.0 | 0.2 | −0.2 | −0.9 | −1.3 |
| FOURTEEN (14) DAYS | −29.3 | −1.3 | −0.9 | −1.2 | −2.0 |
| TWENTY-EIGHT (28) DAYS | −33.6 | −1.4 | −0.6 | −1.2 | −1.7 |
| −20F | | | | | |
| ONE (1) DAY | −18.2 | −0.5 | −0.8 | −0.6 | −1.1 |
| TWO (2) DAYS | −24.4 | −0.3 | −0.9 | −0.3 | −1.0 |
| SEVEN (7) DAYS | −31.4 | −0.2 | −0.3 | −0.6 | 0.5 |

The results in Table 2 indicate that the dimensional stability of the rigid polyurethane foams at catalyst levels above 0.4 pbw are excellent, and also have low friabilities and small changes in K factors after 10 days. The porosity values indicate that whether the foam is closed celled (samples 1–3) or open celled (samples 4–5), the dimensional stability of foam samples 2–5 were excellent. Furthermore, the numerical proximity between the overall and core densities being less than about 11% is an indicator of good flow.

EXAMPLE II

The foam formulations of samples 1–5 and comparative sample 6 were tested for flowability. Comparative sample 6 was made by mixing 75 pbw Polyol A, 25 pbw Polyol E, 1.5 pbw Suffactant A, 2.5 pbw Catalyst D, and 7.0 pbw water as a polyol composition reacted with 220.30 pbw Iso. A at an index of 109 on a high pressure impingement mixing machine calibrated at the values stated in Table 3 below. The calibration values for samples 1–5 are also reported. The reaction profile of comparative sample 6 was taken by a 3.0 second shot into a #10 Lily cup and determined to have a 5.5 s cream, 28 s gel, 37 s rise, and 58 s tack free time, for a 1.57 pcf free rise foam. The free rise foam made in this cup pulled away from the sides of the cup overnight at room temperature indicating the foam is one which has extreme shrinkage.

The flow of each sample was determined by pouring a shot of the reaction mixture from the machine at the reported weights and times into a flexible tube and allowing the reaction mixture to flow through the tube, react, and foam in the tube. The foam length in centimeters which indicates flowability is reported.

TABLE 3

| SAMPLE | 1 | 2 | 3 | 4 | 5 | 6 |
|---|---|---|---|---|---|---|
| CALIBRATION | | | | | | |
| RESIN | 67.8 | 67.8 | 69.3 | 69.3 | 65.6 | 63.1 |
| ISOCYANATE | 126.6 | 126.6 | 126.0 | 126.0 | 125.4 | 129.0 |
| RPM, RESIN | 486 | 486 | 496 | 496 | 465 | 438 |
| RPM, ISOCYANATE | 750 | 750 | 750 | 750 | 750 | 750 |
| PRESSURE, RESIN | 2800 | 2800 | 2700 | 2700 | 2200 | 2100 |
| PRESSURE, ISO. | 2100 | 2100 | 2200 | 2200 | 2200 | 2000 |
| SHOT TIME, SEC. | 1.33 | 1.35 | 1.35 | 1.35 | 1.5 | 1.35 |
| SHOT WEIGHT, GRS | 96.6 | 97.6 | 98.5 | 98.5 | 105.1 | 95.5 |
| FOAM LENGTH, CM. | 132 | 142 | 159 | 161 | 167 | 140 |

The results indicate that all water blown foams (samples 2–5) having the proper polyol component and catalysts flow well and are dimensionally stable. The flowability of samples 2–5 indicated by foam length was markedly improved over the flowability of comparative sample 6 which did not contain the proper polyol component and had no blowing catalyst present. The flowability of sample 1 was poor because of the low catalytic levels totaling only 0.4.

What we claim is:

1. A rigid closed cell polyurethane foam having a core density of 1.1 pcf to 2.0 pcf made by reacting a reaction mixture comprised of an organic polyisocyanate and a polyol composition further comprising:

a polyol component, a tertiary amine blow catalyst, a tertiary amine delayed action gel catalyst, and water as the sole blowing agent, said polyol component comprising:

a) a polyoxyalkylene polyether polyol having an equivalent weight of 130 or less, an average functionality of 3.1 or greater, and a hydroxyl number of 400 or more;

b) a polyoxyalkylene polyether polyol having an average functionality from 1.5 to less than 3.1 and a viscosity of 800 cP or less at 25° C.; and c) a polyoxyalkylene polyether polyol having an average functionality of greater than 3.1 and an equivalent weight of greater than 130, wherein the combined amount of said blow catalyst and said delayed action gel catalyst is between about 0.4 pbw to 4.0 pbw based on 100 pbw of the polyol component, said rigid polyurethane foam being dimensionally stable according to the ASTM D 2126-87 test method by exhibiting a volume change of no more than ±10 percent at 158° F. and 100 percent relative humidity, of no more than ±7 percent at 200° F. and 0.0 percent relative humidity, and of no more than ±5 percent at −20° F. and 0.0 percent relative humidity, and exhibiting a surface friability of less than 6% according to the ASTM C 421 test method.

2. The rigid closed cell polyurethane foam of claim 1, wherein the core density is from 1.1 pcf to 2.0 pcf, having a volume change of no more than ±8 percent at 158° F. and 100 percent relative humidity, no more than ±3 percent at 200° F. at 0.0 percent relative humidity, and no more than ±3 percent at −20° F. and 0.0 percent relative humidity.

3. The rigid closed cell polyurethane foam of claim 2, wherein the core density is from 1.3 pcf to 1.7 pcf.

* * * * *